(12) United States Patent
Clark

(10) Patent No.: US 6,363,602 B1
(45) Date of Patent: Apr. 2, 2002

(54) CLAMP ORIENTATION MACHINE AND METHOD OF OPERATION THEREFOR TO APPLY A CLAMP TO A HOSE

(75) Inventor: Thomas R. Clark, Bowling Green, OH (US)

(73) Assignee: T. R. Clark Manufacturing, Inc., Bowling Green, OH (US)

( * ) Notice: Subject to any disclaimer, the term of this patent is extended or adjusted under 35 U.S.C. 154(b) by 0 days.

(21) Appl. No.: 09/479,203

(22) Filed: Jan. 7, 2000

Related U.S. Application Data (60) Provisional application No. 60/116,037, filed on Jan. 11, 1999.

(51) Int. Cl.[7] .............................. B23P 11/02; B23Q 7/10; B25B 27/10
(52) U.S. Cl. .................. 29/450; 29/243.56; 29/809; 29/229; 29/717; 81/9.3
(58) Field of Search ........................ 29/809, 243.56, 29/450, 235, 237, 229, 407.01, 717, 715; 81/9.3

(56) References Cited

U.S. PATENT DOCUMENTS

| | | | | |
|---|---|---|---|---|
| 3,091,143 A | * | 5/1963 | Coy | |
| 3,628,230 A | * | 12/1971 | Grise | |
| 4,122,733 A | * | 10/1978 | Ott et al. | |
| 4,919,017 A | * | 4/1990 | Thomas | |
| 5,020,355 A | * | 6/1991 | Payne et al. | |
| 5,035,040 A | * | 7/1991 | Kerrigan et al. | |
| 5,125,296 A | * | 6/1992 | Nelson et al. | |
| 5,253,554 A | * | 10/1993 | Riera et al. | |
| 6,164,162 A | * | 12/2000 | Furundzic | |

FOREIGN PATENT DOCUMENTS

JP      63-28533      2/1988

OTHER PUBLICATIONS

Advertisement, "PNEU–TURN" Rotary Actuator, Bimba Manufacturing Company, 1995.
Advertisement, "Model P–6000" and Model P–6100 Grippers, Robotic Accessories, Process Equipment Company, undated.

* cited by examiner

*Primary Examiner*—David P. Bryant
(74) *Attorney, Agent, or Firm*—Emch, Schaffer, Schaub & Porcello Co., L.P.A.

(57) ABSTRACT

A clamp orientation machine and a method of operation therefor wherein the machine includes a magazine for containing at least one clamp, a movable clamp support member for supporting a clamp received from the magazine, a pair of movable gripper fingers for gripping and positioning a clamp received from the clamp support member and a cavity for supporting and positioning a hose for receiving a clamp from said gripper fingers.

10 Claims, 9 Drawing Sheets

CLAMP ORIENTATION MACHINE AND METHOD OF OPERATION THEREFOR TO APPLY A CLAMP TO A HOSE

This appln claims benefit of Prov. appln No. 60/116,037 filed Jan. 11, 1999.

BACKGROUND OF THE INVENTION

The present invention relates generally to a clamp orientation machine. More specifically, the invention is directed to a machine and a method of operation therefor that positions a clamp in proper orientation to an object, such as a hose.

In the past, clamps have been manually positioned on hoses. For example, an operator has used hand held tools to pinch open a clamp and manually slide the clamp over the hose. The manual installation of clamps has resulted in problems such as poor quality, slow cycle time and danger to the operator.

It has been found that there is a need for a clamp orientation machine and a method of operation therefor that eliminate the problems associated with the manual installation of clamps. The present invention satisfies this need.

SUMMARY OF THE INVENTION

The present invention is directed to a clamp orientation machine and a method of operation therefor. The clamp orientation machine includes, among other things, a magazine for containing at least one clamp. The magazine is in communication with a moveable clamp support member for supporting a clamp received from the magazine. The machine includes a pair of movable gripper fingers for gripping and positioning a clamp received from the clamp support member. The machine includes a fixture having a cavity for supporting and positioning, for example, a hose for receiving a clamp from the gripper fingers.

The method of the present invention includes the steps of:

(a) positioning a clamp on a movable clamp support;

(b) actuating the clamp support to move the clamp adjacent to gripping means for gripping and positioning the clamp;

(c) positioning an object adjacent to the gripping means on an object support; and (d) actuating the gripping means to release the clamp onto the object.

A primary object of the present invention is to provide a clamp orientation machine and a method of operation therefor that efficiently positions a clamp on an object.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

The preferred embodiments and best mode of the present invention will now be described in detail with reference being made to the drawings. The clamp orientation machine of the present invention is indicated generally in the drawings by the references number "10".

Figure 1:
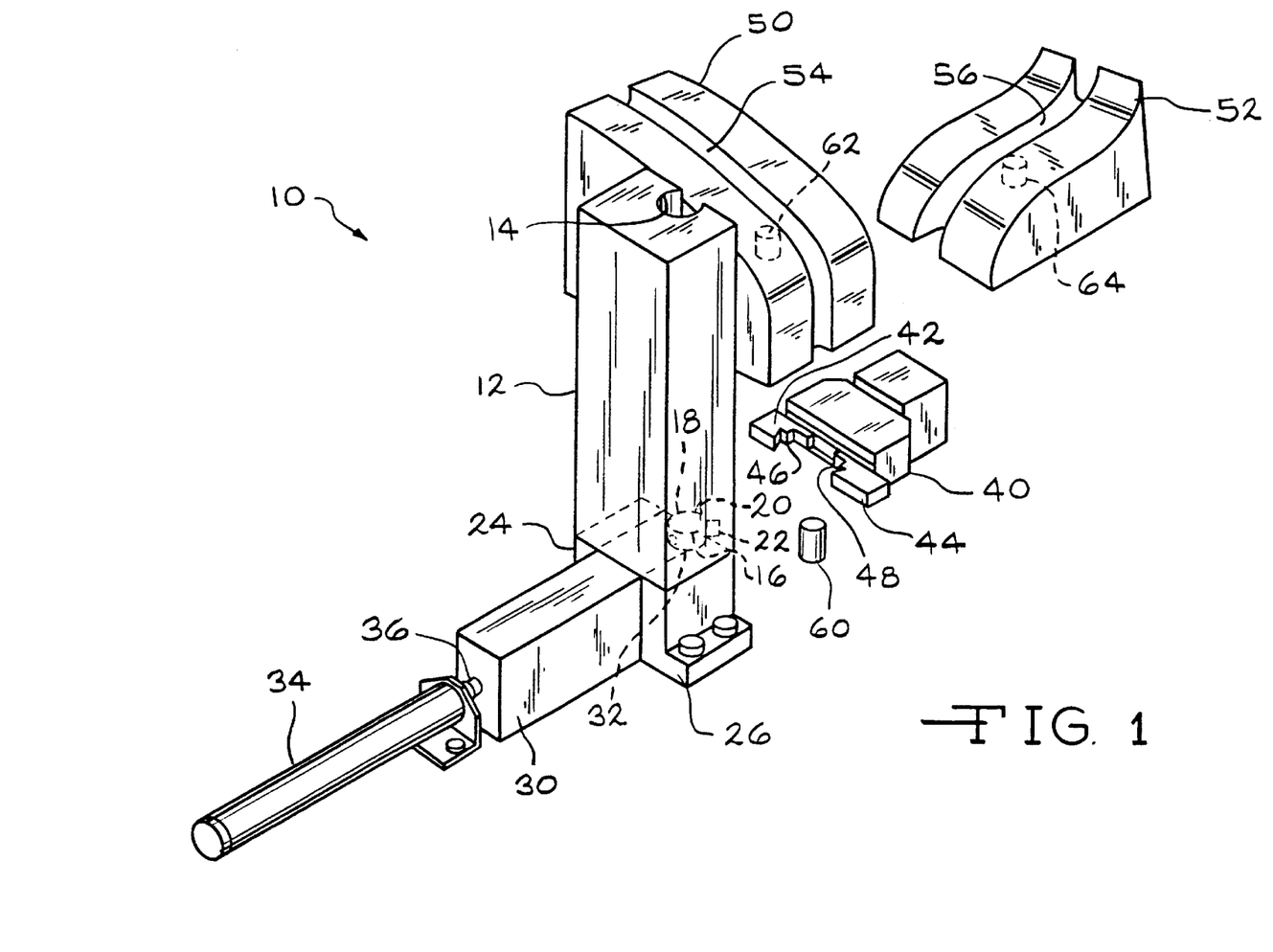
FIG. 1 is a perspective schematic view of a first embodiment clamp orientation machine according to the present invention in which a clamp is positioned on a movable clamp support.

A first embodiment machine 10 is shown in FIGS. 1–4. Referring to FIG. 1, the machine 10 includes a clamp magazine 12 having a cavity 14 that is adapted and sized to receive a clamp 16. The cavity 14 is vertically extending for receiving a plurality of vertically stacked clamps 16. By way of example, only one clamp 16 is shown in the drawings. The clamp 16 is a conventional spring-loaded clamp having a circular member 18 and a pair of projections 20 and 22. When the projections 20 and 22 are squeezed together, the circular member 18 increases in diameter.

The magazine 12 is positioned on a pair of spaced L-shaped support members 24 and 26. The support members 24 and 26 are mounted on a base (not shown).

Still referring to FIG. 1, the machine 10 includes a clamp support member 30 that is movably positioned between the L-shaped support members 24 and 26. The clamp support member 30 includes a recess 32 that is adapted and sized to receive a clamp 16 dispensed from the cavity 14 of the magazine 12. As shown in FIG. 1, the clamp 16 is positioned so that the projections 20 and 22 are outwardly extending with respect to the recess 32. The clamp support member 30 is connected to a cylinder 34 by a rod 36. Actuation of the cylinder 34 causes reciprocating movement of the rod 36 and thus the clamp support member 30.

As shown in FIG. 1, the machine 10 includes a gripper 40 having a pair of pneumaticly actuated gripper fingers 42 and 44. The gripper fingers 42 and 44 are laterally movable with respect to one another. The gripper fingers 42 and 44 include clamp engaging portions 46 and 48, respectively, that are adapted and sized to engage projections 20 and 22 of the clamp 16.

Still referring to FIG. 1, the machine 10 includes fixtures 50 and 52 that include cavities 54 and 56, respectively. The cavities 54 and 56 are adapted and sized to receive an object such as an automotive hose.

As shown in FIG. 1, the machine 10 includes a first sensing device 60 positioned adjacent to the gripper 40, a second sensing device 62 positioned adjacent to the cavity 54 of the fixture 50 and a third sensing device 64 positioned adjacent to the cavity 56 of the fixture 52. The first, second and third sensing devices 60, 62 and 64 are in electrical communication with a signaling device (not shown).

The method of operation of the machine 10 will now be described with reference being made to FIGS. 1–4. As shown in FIG. 1, a clamp 16, is dispensed from the cavity 14 of the magazine 12 into the recess 32 of the clamp support member 30. The clamp 16 is positioned in the recess 32 so that the projections 20 and 22 extend outwardly from the recess 32.

Figure 2:
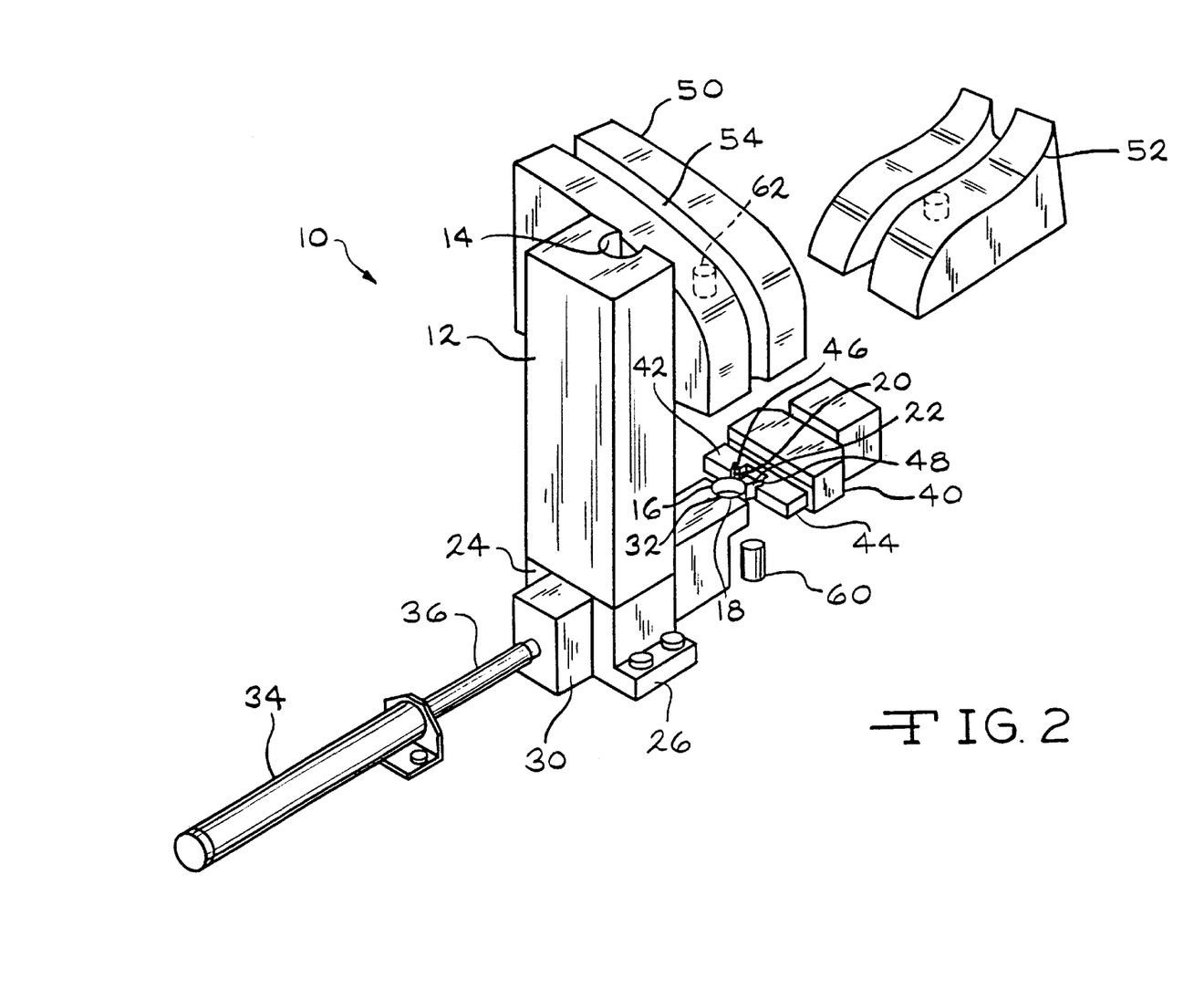
FIG. 2 is a view similar to FIG. 1 in which the clamp support member has positioned the clamp in the gripper device.

As shown in FIG. 2, the cylinder 34 is actuated to cause the rod 36 to move the clamp support member 30 toward the gripper 40. The clamp support member 30 is moved until the projections 20 and 22 of the clamp 16 are positioned adjacent to the gripper fingers 42 and 44, respectively. The gripper fingers 42 and 44 are then moved together. The clamp engaging portions 46 and 48 of the gripper fingers 42 and 44, respectively, engage and squeeze the projections 20 and 22 of the clamp 16, respectively. The squeezing action on the projections 20 and 22 causes the diameter of the circular member 18 of the clamp 16 to increase.

Figure 3:
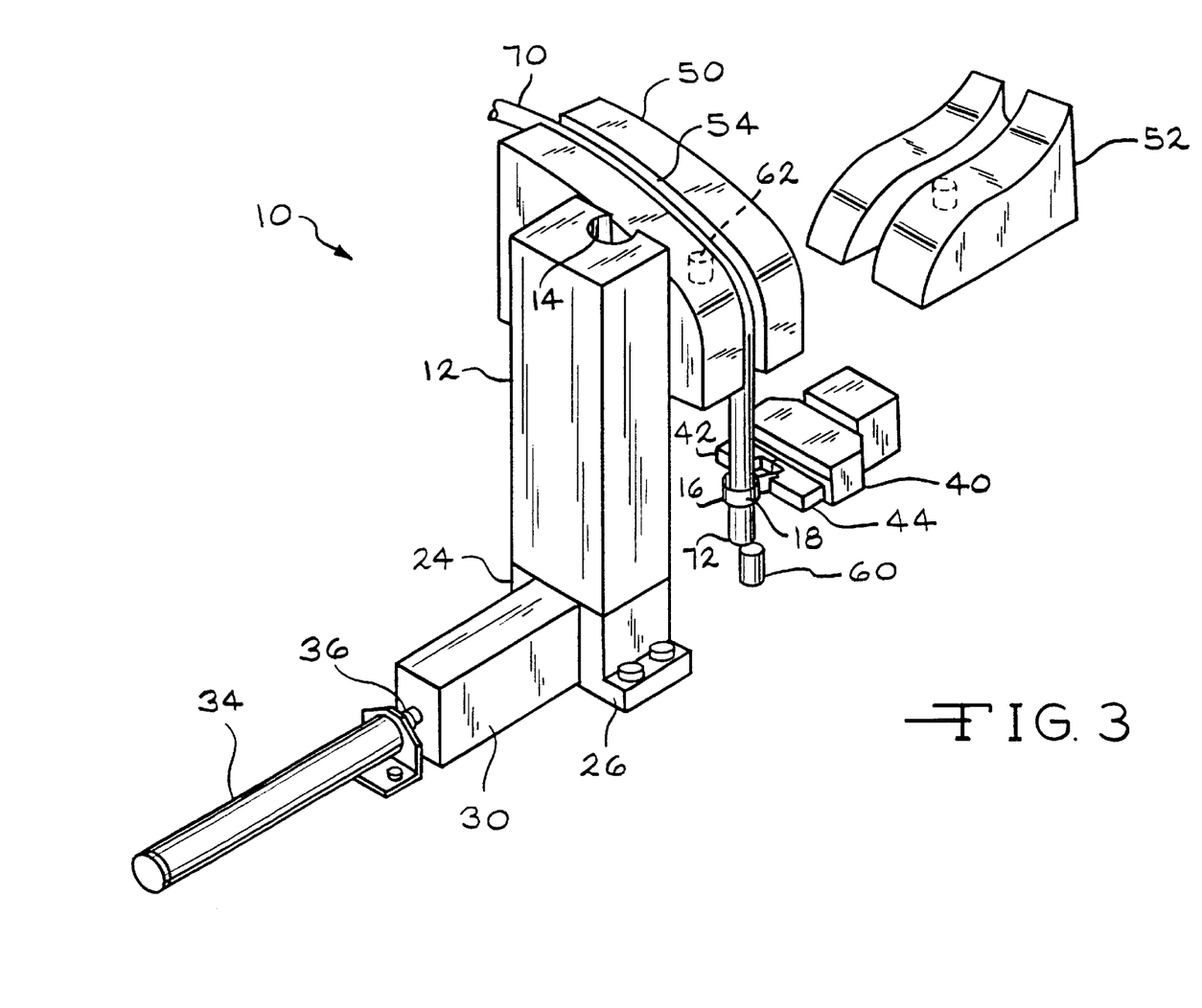
FIG. 3 is a view similar to FIG. 1 in which a hose has been positioned in a cavity of a fixture so that an end of the hose is inserted through the clamp.

Referring to FIG. 3, the cylinder 34 is actuated to cause the rod 36 to move the clamp support member 30 away from the gripper 40. An operator (not shown) positions an automotive hose 70 in the cavity 54 of the fixture 50. An end 72 of the hose 70 is positioned in the circular member 18 of the clamp 16. The first sensing device 60 senses the position of the hose end 72. The second sensing device 62 senses the position of the hose 70 in the cavity 54. If the hose end 72 and the hose 70 are properly positioned, the first and second sensing devices 60 and 62 actuate the signaling device to provide the operator with a signal.

Figure 4:
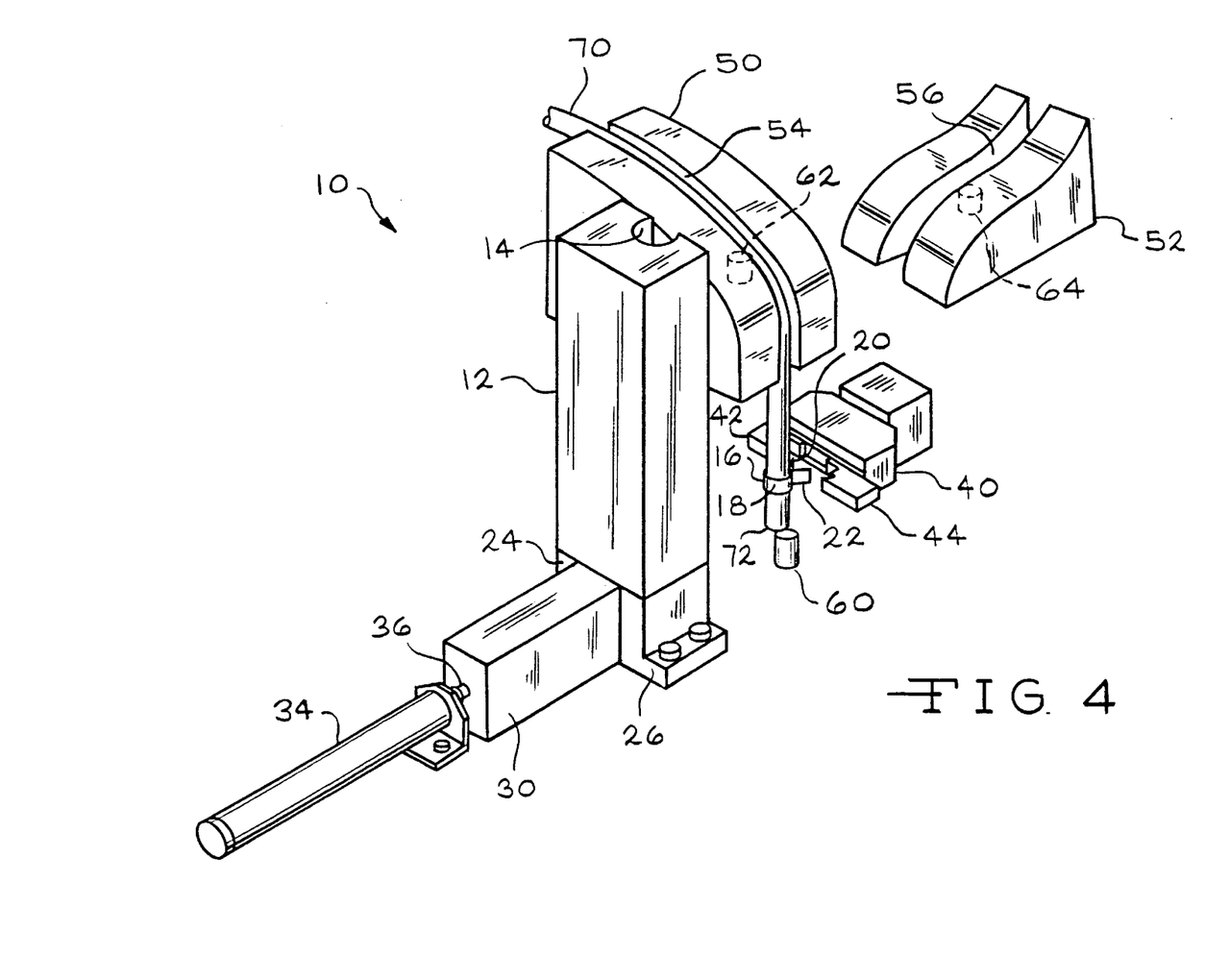
FIG. 4 is a view similar to FIG. 1 in which the gripper device has released the clamp onto the hose.

Referring to FIG. 4, the operator actuates the gripper 40 to cause the gripper fingers 42 and 44 to move away from one another to release the projections 20 and 22 of the clamp 16. This results in a decrease in the diameter of the circular member 18 of the clamp 16 so that the circular member snugly engages the hose 70. The clamp 16 is thus oriented at a predetermined position on the hose 70. The hose 70 is then removed from the fixture 50 by the operator. The method can be repeated to place a clamp 16 on the other hose end (not shown) by placing the hose 70 in the cavity 56 of the fixture 52. The third sensing device 64 senses the position of the hose 70 in the cavity 56.

A second embodiment machine 10 and a method of operation therefor are shown in FIGS. 5–9. The machine 10 includes all of the elements described above with respect to the first embodiment machine 10 as shown in FIGS. 1–4. Accordingly, the same reference numbers for the elements have been used in FIGS. 5–9.

Figure 5:
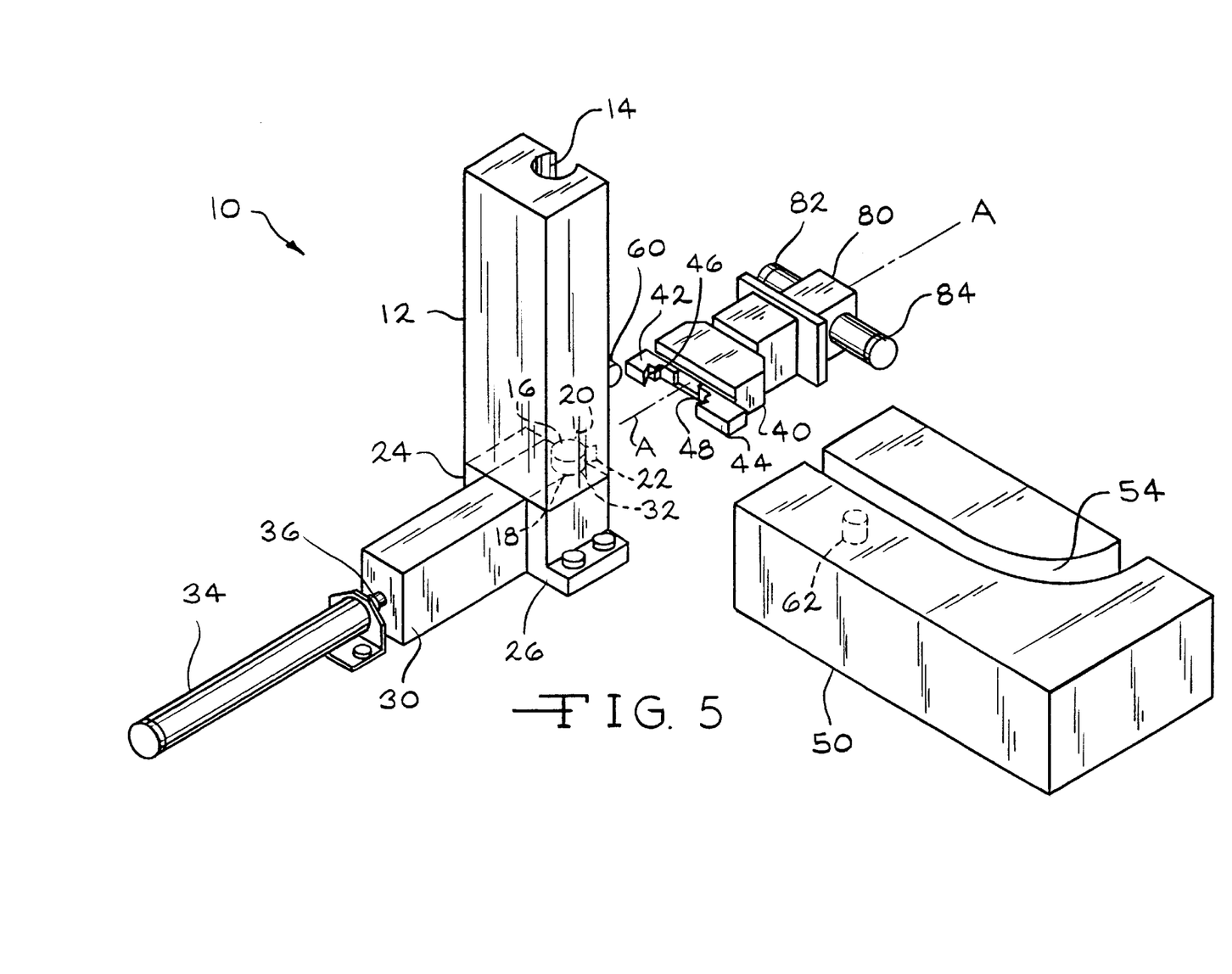
FIG. 5 is a perspective schematic view of a second embodiment clamp orientation machine according to the present invention in which a clamp has been positioned on a movable clamp support member.
Figure 6:
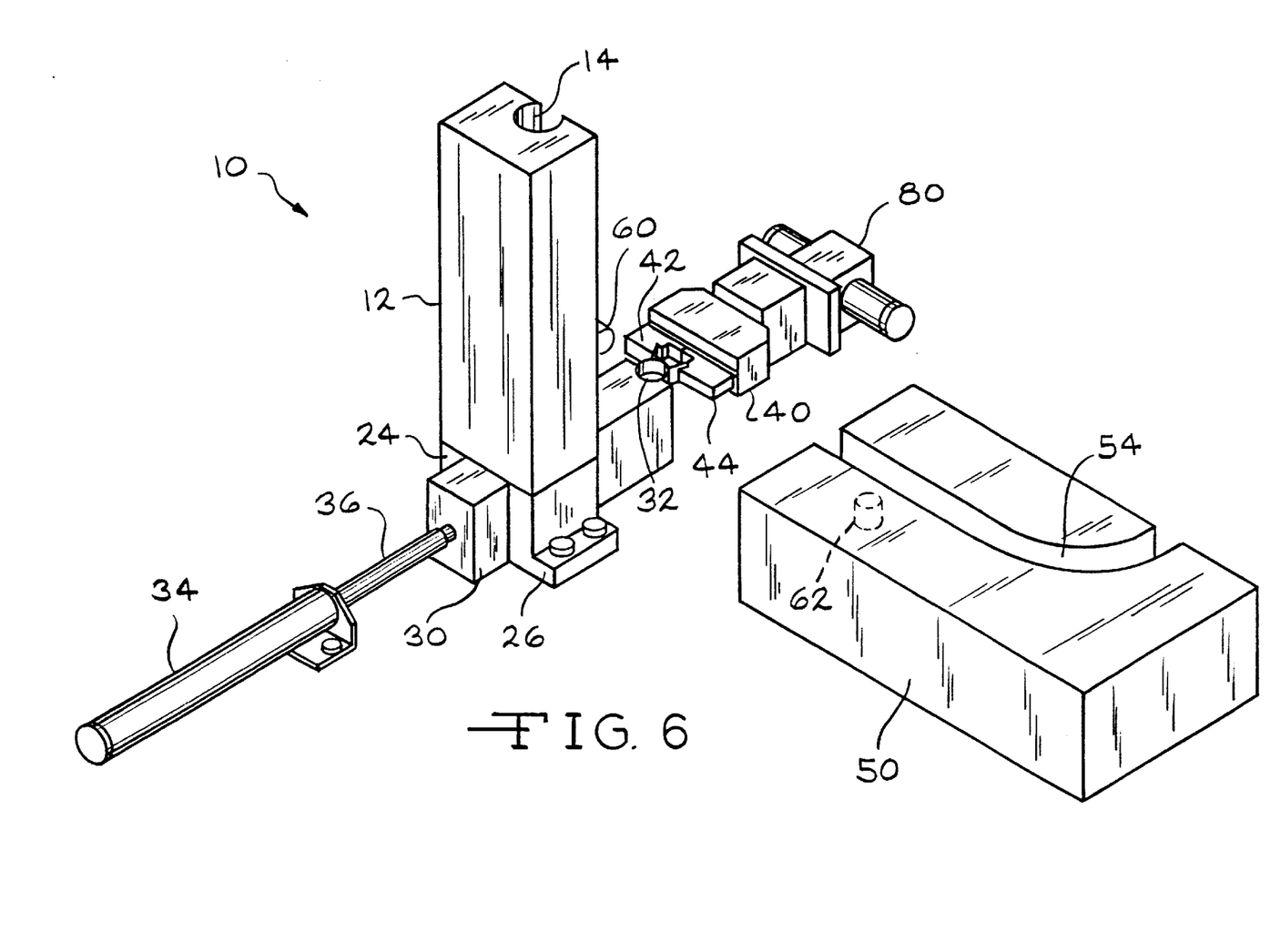
FIG. 6 is a view similar to FIG. 5 in which a rotatable gripper device has received the clamp from the movable clamp support member.
Figure 7:
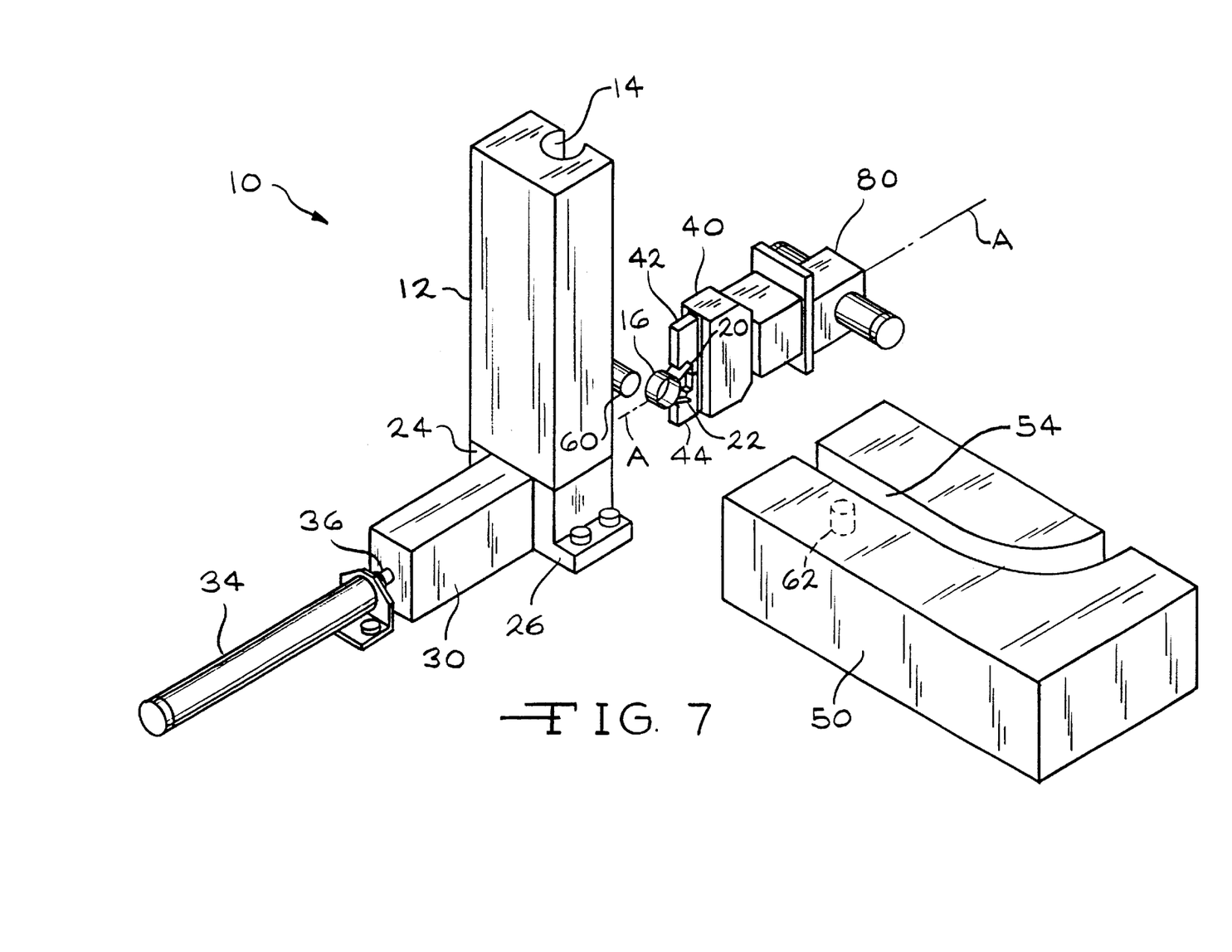
FIG. 7 is a view similar to FIG. 5 in which the gripper device has been rotated about a longitudinal axis.

The first embodiment machine 10 as shown in FIGS. 1–4 is used in applications where the hose 70 is in a "vertical" position. The second embodiment machine 10 as shown in FIGS. 5–9 is used when the hose 70 is in a "horizontal" position. In this regard, the gripper 40 includes a pneumatic rotary actuator 80 for rotating the gripper fingers 42 and 44 about a longitudinal axis A as shown in FIG. 5. The rotary actuator 80 includes a pair of conventional Hall switches 82 and 84.

Figure 8:
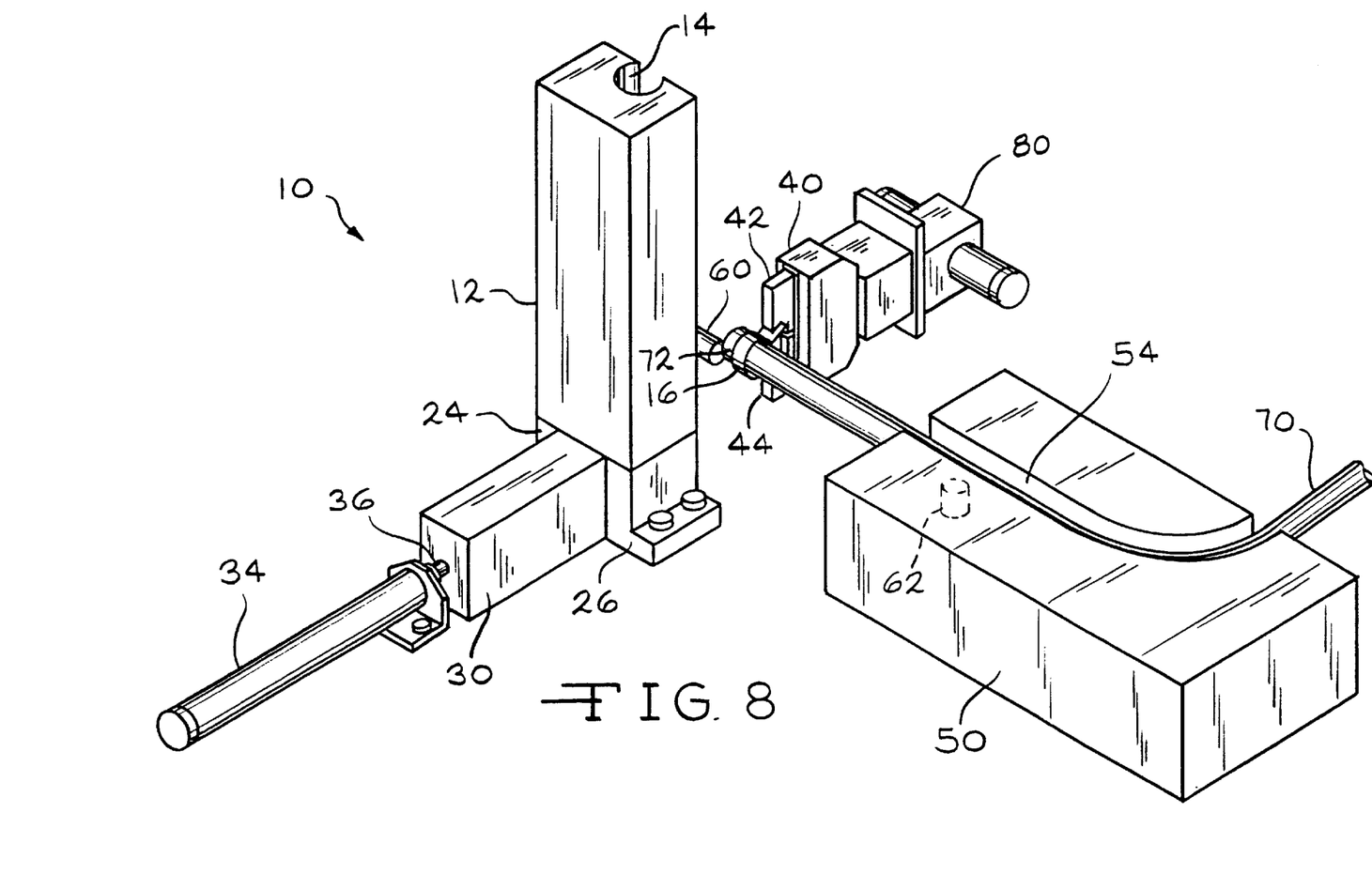
FIG. 8 is a view similar to FIG. 5 in which a hose has been positioned in a cavity of a fixture so that an end of the hose is inserted through the clamp.
Figure 9:
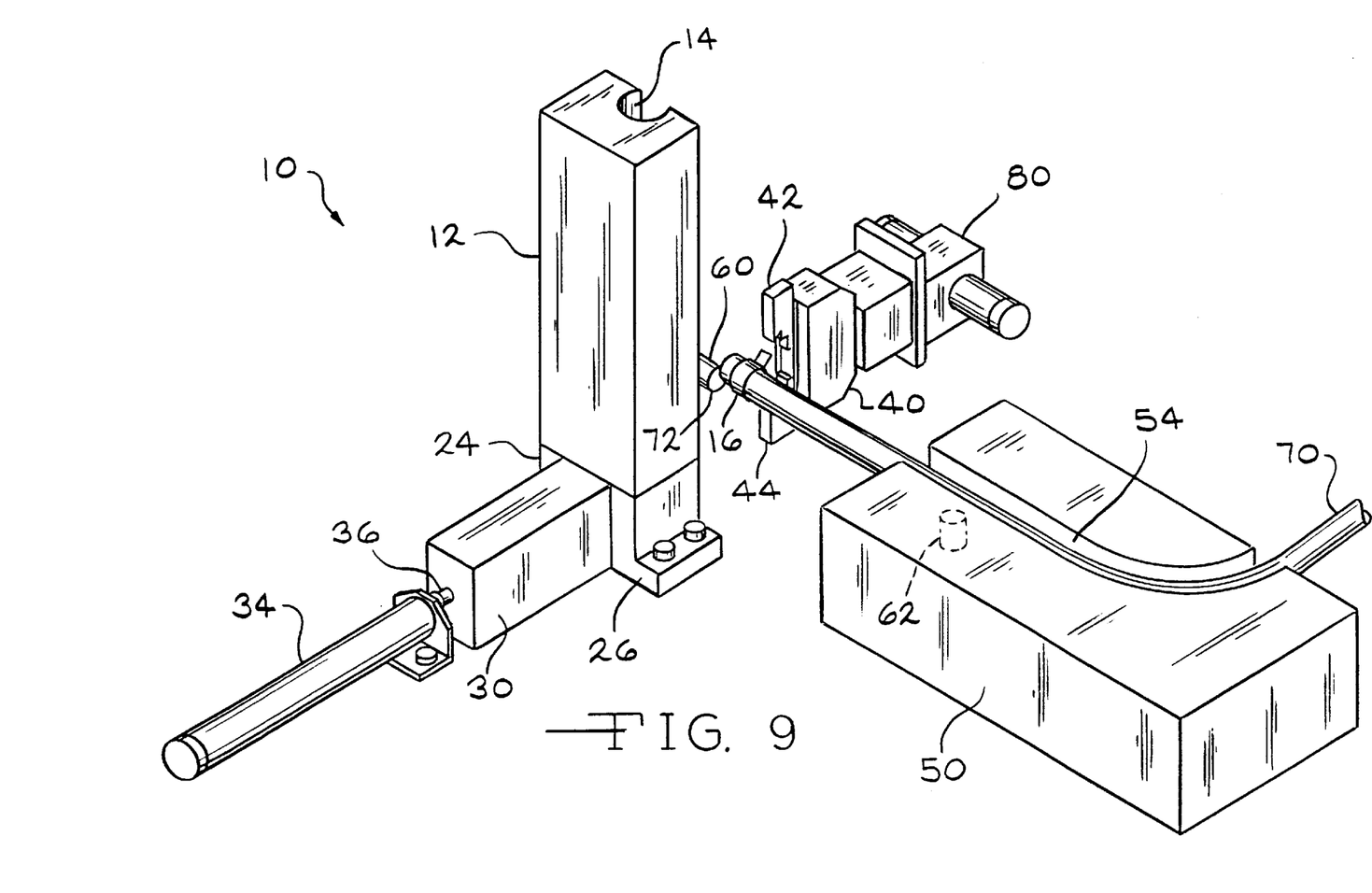
FIG. 9 is a view similar to FIG. 5 in which the gripper device has released the clamp onto the hose.

The method of operation of the second embodiment machine 10 is the same as for the method described above except there is an additional step of rotating the gripper fingers 42 and 44 about the longitudinal axis after the gripper fingers 42 and 44 have engaged the projections 20 and 22 of the clamp 16. As shown in FIG. 8, the hose end 72 of the hose 70 can then be inserted through the circular member 18 of the clamp 16.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A clamp orientation machine comprising:

dispensing means for dispensing an expandable clamp having projections;

clamp support means for supporting and moving said clamp received from said dispensing means;

gripping means having movable gripping members for engaging said projections of said clamp received from said clamp support means to cause said clamp to expand, and supporting means for supporting an object upon which said clamp is placed by said gripping means when said gripping members disengage said projections causing said clamp to contract and engage said object.

2. The clamp orientation machine of claim 1, wherein said dispensing means includes a magazine for containing at least one clamp.

3. The clamp orientation machine of claim 1, wherein said dispensing means includes a movable clamp support member operatively connected to a reciprocating rod and cylinder assembly.

4. The clamp orientation machine of claim 1, wherein said gripping means includes a pair of movable gripping fingers.

5. The clamp orientation machine of claim 1, wherein said gripping means is rotatable about a longitudinal axis.

6. The clamp orientation machine of claim 1, wherein said support means includes at least one cavity for supporting an object.

7. The clamp orientation machine of claim 6, wherein sensing means for sensing an object is positioned adjacent to said cavity.

8. The clamp orientation machine of claim 1, wherein sensing means for sensing an object is positioned adjacent to said gripping means.

9. A clamp orientation machine comprising;

a magazine for dispensing an expandable clamp having a pair of projections;

a movable clamp support member for supporting and moving said clamp received from said magazine;

a pair of movable gripper fingers for engaging said projections of said clamp received from said clamp support member to cause said clamp to expand; and a cavity for supporting and positioning a hose upon which said clamp is placed by said gripper fingers when said gripper fingers disengage said projections causing said clamp to contract and engage said hose.

10. A method of operating a clamp orientation machine comprising:

(a) dispensing an expandable clamp having projections from dispensing means to a movable clamp support;

(b) placing said clamp on said movable clamp support;

(c) actuating said clamp support to move said clamp adjacent to gripping means;

(d) gripping said projections of said clamp with said gripping means to cause said clamp to expand;

(e) positioning an object adjacent to said gripping means on an object support; and (f) actuating said gripping means to disengage said projections to cause said clamp to contract and engage said object.

* * * * *